United States Patent
Tan et al.

(10) Patent No.: US 8,218,558 B2
(45) Date of Patent: Jul. 10, 2012

(54) DATA TRANSFER SYSTEM ENABLING ACCESS TO MULTIPLE SUBNETS AND METHOD THEREOF

(75) Inventors: Der-Hwa Tan, Hsinchu County (TW); Chia-Meng Chen, Hsinchu County (TW); Chung-Chiu Lai, Hsinchu County (TW)

(73) Assignee: Gemtek Technology Co. Ltd., Hsinchu County (TW)

( * ) Notice: Subject to any disclaimer, the term of this patent is extended or adjusted under 35 U.S.C. 154(b) by 248 days.

(21) Appl. No.: 12/830,361

(22) Filed: Jul. 5, 2010

(65) Prior Publication Data

US 2011/0206052 A1    Aug. 25, 2011

(30) Foreign Application Priority Data

Feb. 25, 2010 (TW) ................. 99105519 A

(51) Int. Cl.
*H04L 12/28* (2006.01)

(52) U.S. Cl. ....................................... 370/401; 370/392
(58) Field of Classification Search .................. None
See application file for complete search history.

(56) References Cited

U.S. PATENT DOCUMENTS

| | | | |
|---|---|---|---|
| 7,509,491 B1 * | 3/2009 | Wainner et al. | 713/163 |
| 7,542,476 B2 * | 6/2009 | Almog et al. | 370/401 |
| 7,840,701 B2 * | 11/2010 | Hsu et al. | 709/238 |
| 2004/0264402 A9 * | 12/2004 | Whitmore et al. | 370/328 |

* cited by examiner

*Primary Examiner* — Duc C Ho
(74) *Attorney, Agent, or Firm* — WPAT, P.C.; Anthony King

(57) ABSTRACT

A data transfer system enabling access to multiple subnets and method thereof is disclosed. The data transfer method includes the following steps: executing a virtual private network (VPN) client installed on an electronic system; connecting the VPN client to a VPN router; the VPN client assigning a virtual IP address to a virtual interface; and the VPN client accessing a subnet corresponding to the virtual IP address through the virtual IP address.

20 Claims, 5 Drawing Sheets

DATA TRANSFER SYSTEM ENABLING ACCESS TO MULTIPLE SUBNETS AND METHOD THEREOF

FIELD OF THE INVENTION

The present invention relates to a data transfer system enabling access to multiple subnets and method thereof, and more particularly, to a data transfer system allowing a user to switch among and access multiple subnets and method thereof.

BACKGROUND OF THE INVENTION

Nowadays, virtual private network (VPN) is an important technique for providing safe and dedicated communication connection over the public Internet. However, for general users, it is not easy to set up a VPN. For users who have to use VPNs, how to provide safe and convenient connection and access to VPN is an important issue. Complicated procedures involved in the setup of application programs and various limitations in accessing network resources would cause great inconveniences to users. For the purpose of simplifying the setup of a VPN, some commercially available products suggest that using Hypertext Transfer Protocol over Secure Socket Layer (HTTPS) as a communication channel to establish a VPN, so that a user can determine which subnets in the VPN is accessible without understanding all the complicated procedures of setting up the VPN. Regarding to the established VPN connection of an Internet Protocol Security (IPSec) VPN, using HTTPS as the communication channel and using Microsoft Windows IPSec utility to establish a connection of an IPSec VPN are already known techniques. However, due to the highly complicated procedures of completing IPSec-related settings through the Local Security Policy, the currently available technique can only provide access to one-single subnet.

With the currently available network techniques, there is rapid growth in the network environment, and most of the enterprise networks usually have different network routings for different departments. Providing access to a single subnet can no longer satisfy the requirement. Currently, most of the small and medium business routers provide multiple subnets, and even many So-Ho routers are equipped with this function as well. Speaking of the information security, using virtual local area network (VLAN) techniques to distinguish various kinds of networks into user network and resource network is also a widely adopted way in network management. Therefore, when a VPN can only provide the access to single subnet, it would cause great inconveniences to users. Also, complication and security issues might be raised in network management if all important resources are in a certain subnet because of the limitations of VPN accessibility.

The conventional IPSec VPN application software adopting Microsoft Windows IPSec utility has another disadvantage with regard to network addressing. That is, the IPSec tunnel established by the conventional IPSec VPN application software adopting Microsoft Windows IPSec utility is using a host-to-gateway mode. Thus, the source IP address of the packet is the address of the computer running the application software, and this type of IP address might be a public IP address. When a user adopts the above application software to establish the IPSec tunnel and to connect to an intranet network, the packet with such public IP address might be detoured by a local default routing in the intranet network to result network latency. Further, packet missing might occur to cause problems in network management when the enterprise firewall does not allow such type of packets in the local area network.

SUMMARY OF THE INVENTION

In view of the drawbacks, an object of the present invention is to solve the problem causing by signal subnet accessibility in the IPSec utility under the premise of establishing an IPSec VPN by Microsoft Windows IPSec utility. The present invention further provides the function of accessing from different subnets by adopting the virtual IP address, so that a network manager can control the VPN packet address in a convenient manner.

Therefore, according to one aspect of the present invention, there is provided a data transfer system enabling access to multiple subnets. The data transfer system includes an electronic system, a VPN router, and a plurality of remote electronic systems. The electronic system includes a memory unit, a network unit, and a processing unit. The memory unit includes a VPN client for simulating a virtual interface and assigning a virtual IP address to the virtual interface. The network unit provides a network transmission module. The processing unit is connected to the memory unit and the network unit. The VPN router is connected to the electronic system via the network unit, so that the electronic system can log onto a VPN. The remote electronic systems are connected to the VPN router and are distributed in at least one subnet of the VPN. After obtaining the virtual IP address by the VPN router, the electronic system is connected to the remote electronic systems in the subnet.

In the data transfer system of the present invention, the network unit may be a network interface card or a network interface chip.

In the data transfer system of the present invention, the electronic system can be connected to the VPN router by a tunneling mode, which can be a split tunnel or a full tunnel, when the electronic system is connected to the VPN router. When the electronic system is connected to the VPN router through the split tunnel, only partial connections of the VPN client are directed to the VPN router. On the other hand, when the electronic system is connected to the VPN router through the full tunnel, all the connections of the VPN client are directed to the VPN router.

In the data transfer system of the present invention, the VPN client is connected to the VPN router in compliance with a network protocol, which can be HTTPS or HTTP.

In the data transfer system of the present invention, a connection between the VPN client and the VPN router may be established in compliance with the an Internet Protocol Security (IPSec) protocol, and the IPSec protocol may comprise a packet encryption process.

In the data transfer system of the present invention, the virtual interface has a virtual network interface card function simulated by the VPN client, and the virtual IP address can be assigned to the virtual interface.

In the data transfer system of the present invention, the virtual IP address corresponding to a subnet is within an IP address range of the subnet.

In the data transfer system of the present invention, when the virtual IP address is duplicated, the VPN client is arranged to re-establish the connection to the VPN router.

In the data transfer system of the present invention, the VPN router selectively sets a network address translation (NAT) rule according to the tunneling mode, and a non-physical IP address corresponds to physical IP address mapping in compliance with the NAT rule.

According to another aspect of the present invention, a data transfer method enabling access to multiple subnets is provided. The data transfer method includes the following steps: executing a VPN client installed on an electronic system; connecting the VPN client to a VPN router; assigning a virtual IP address to a virtual interface by the VPN client; and accessing at least one subnet corresponding to the virtual IP address through the virtual IP address and by the VPN client.

In the data transfer method of the present invention, the VPN has subnets. Each of the subnets has a different IP address range from each other, and the VPN router selects the virtual IP address from an unused virtual IP address in a virtual IP address range. Also, the virtual IP address range corresponds to an IP address range of the subnet.

Accordingly, the data transfer system enabling access to multiple subnets and method thereof according to the present invention has one or more of the following advantages:

(1) In the data transfer system and method, the accessibility of the multiple subnets in a VPN is improved by changing the virtual IP address and accessing different subnets.

(2) In the data transfer system and method, the VPN client can be connected to the VPN router via a tunneling mode acceptable to the VPN router, so that the flexibility in connection of the electronic system to the VPN can be increased.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
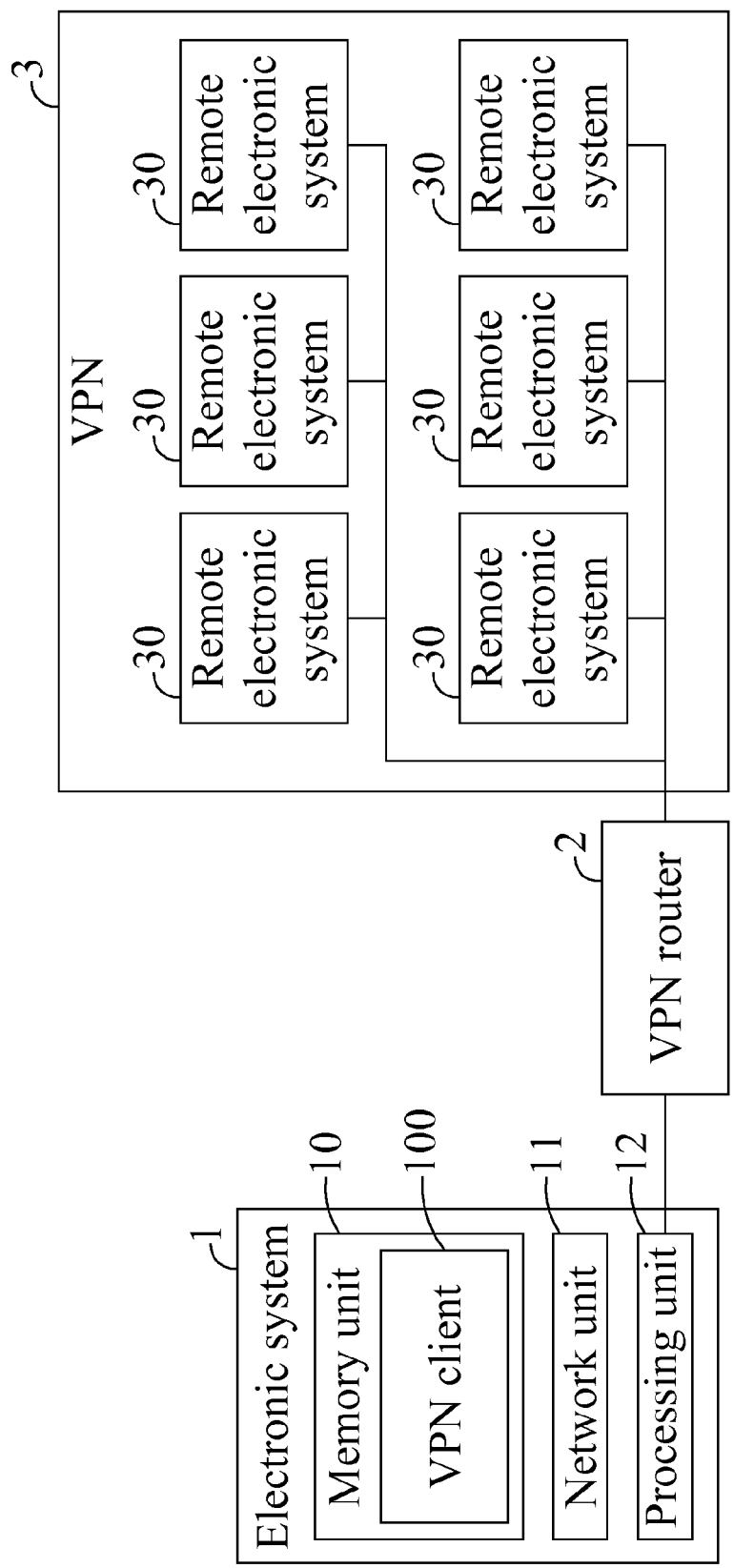
FIG. 1 is a block diagram of a data transfer system enabling access to multiple subnets according to the present invention.

The present invention will now be described with some preferred embodiments thereof. For the purpose of easy to understand, elements that are the same in the preferred embodiments are denoted by the same reference numerals.

Please refer to FIG. 1 that is a block diagram of a data transfer system enabling access to multiple subnets according to the present invention. As shown, the data transfer system includes an electronic system 1, a virtual private network (VPN) router 2, and a plurality of remote electronic systems 30. The electronic system 1 includes a memory unit 10, a network unit 11 and a processing unit 12. The memory unit 10 includes a virtual private network (VPN) client 100 for simulating a virtual interface and assigning a virtual IP address to the virtual interface. The network unit 11 provides a network transmission module. The processing unit 12 is connected to the memory unit 10 and the network unit 11. The VPN router 2 is connected to the network unit 11 of the electronic system 1, so that the electronic system 1 can log onto a VPN 3. The remote electronic systems 30 are connected to the VPN router 2 and are distributed in the VPN 3.

The electronic device 1 is first connected to the VPN router 2 by the network unit 11. A user can use the VPN client 100 to connect to the VPN router 2 via a split tunnel or a full tunnel. Then, a virtual IP address can be obtained by the VPN router 2, and the virtual IP address can be assigned to the virtual interface. Thereafter, the electronic device 1 can be connected to the remote electronic systems 30 in the VPN 3. Also, the network unit may be a network interface card or a network interface chip, and a connection between the VPN client and the VPN router may be established in accordance with the Internet Protocol Security (IPSec) protocol. The IPSec protocol may comprise a packet encryption process. Further, the virtual interface has a virtual network interface card function simulated by the VPN client, and the virtual IP address is assigned to the virtual interface.

Figure 2:
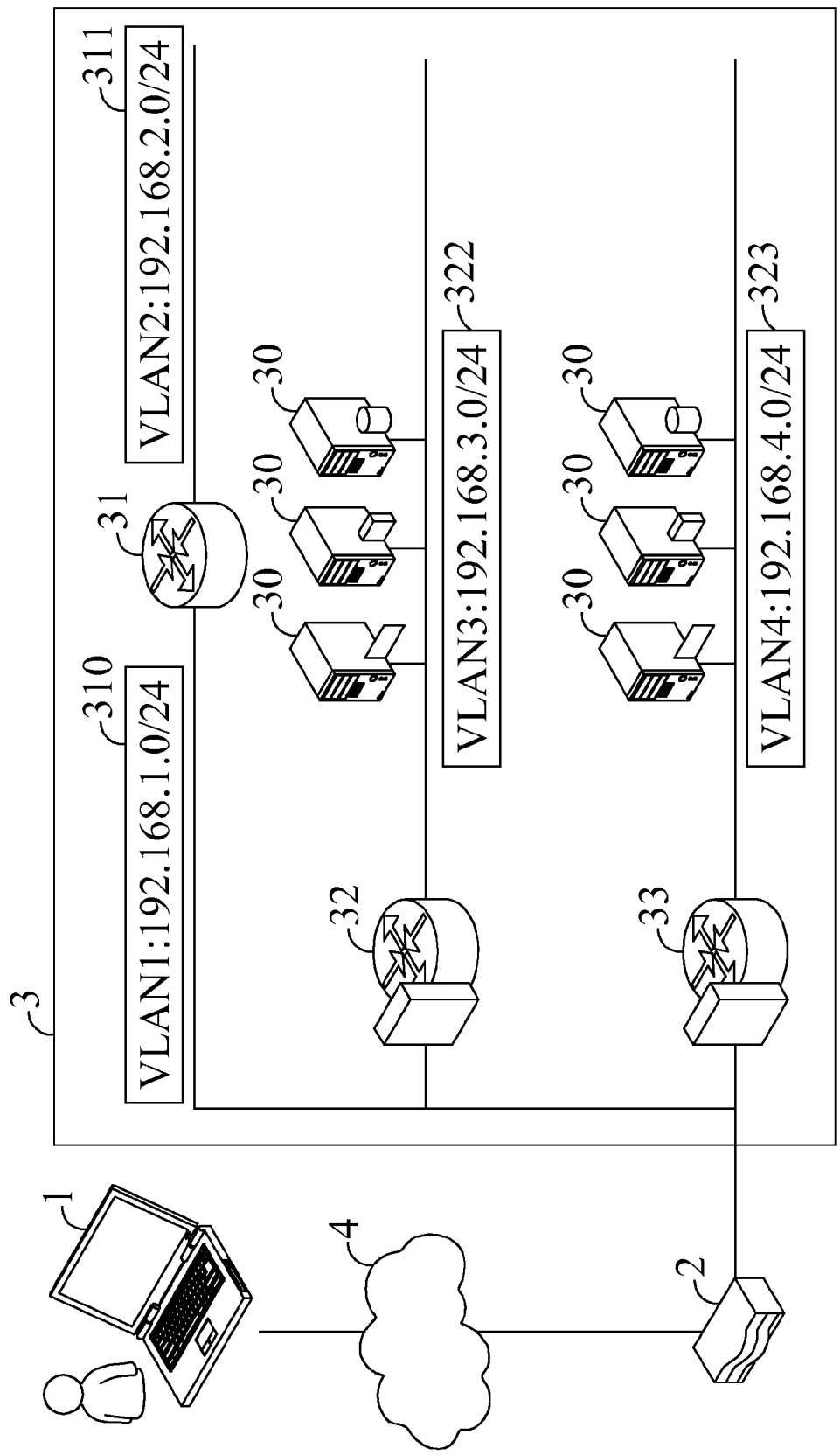
FIG. 2 is a conceptual view explaining a VPN with multiple subnets.

Please refer to FIG. 2 that is a conceptual view explaining VPN with multiple subnets. As shown, a user executes a conventional VPN client on an electronic system 1, and uses a public IP address to connect to a VPN router 2 via Internet 4 using a security network protocol. When a connection between the VPN router 2 and the electronic system 1 is established, the electronic system 1 still uses the original public IP address. By this conventional VPN architecture, the electronic system 1 with the original public IP address can only be connected to a virtual local area network (VLAN) 310 or VLAN1 located upstream of an intranet router 31 and having an IP address range between 192.168.1.0 and 192.168.1.24. Further, the electronic system 1 is only connected to one of the remote electronic systems 30 by peer-to-peer connection, and can not directly or indirectly connect to other VLANs 311, 322 and 323 that located downstream of the intranet router 31. A user would usually encounter a lot of limitations when the user wants to utilize the resources on other conventional remote electronic systems.

To solve this problem, the present invention utilizes the VPN client 100 to obtain a virtual IP address via the VPN router 2. The virtual IP address is an IP address within the IP address range of the VLANs 310, 311, 322 and 323. The VLANs 310, 311, 322 and 323 are respectively a subnet of the VPN 3. When it is desired to access the VLAN 310, first a virtual IP address is assigned to the VPN client 100 by the VPN router 2, and the virtual IP address is ranged from 192.168.1.0 to 192.168.1.24. Then, the electronic system 1 is connected to the VLAN 310. In the event the assigned virtual IP address is the same as an IP address of the remote electronic systems 30, another virtual IP address is assigned again. Therefore, the electronic system 1 can become a member of the VLAN 310, and the local security policy in compliance with the Internet Protocol Security (IPSec) protocol is applicable to the electronic system 1, allowing the electronic system 1 to connect to and use related resources of the VLAN 310. Also, when the user desires to connect to the VLAN 311, the VPN router 2 can assign an IP address ranged between 192.168.2.0 and 192.168.2.24 to the VPN client 100 as a virtual IP address.

Please refer to FIG. 2. Most of the existing hi-tech enterprises usually have more than one complexes or plants, and often have many VPNs. These VPNs are connected to one another in the form of VLANs, such as the VLANs 322 and 323 shown in FIG. 2, and are separated from one another by intranet routers 32, 33. Moreover, in consideration of security, these VLANs respectively use a different network address translation (NAT) rule to enhance the network security. Also, the NAT rule provides a non-physical IP address corresponds to physical IP address in compliance with NAT rule mapping.

When the user intends to connect the electronic system 1 to the VLANs 322 and 323, an IP address corresponding to the IP address ranges of the VLANs 322, 323 must first be assigned to the VPN client 100 by the VPN router 2 to serve as a virtual IP address of the VPN client 100. After obtaining the virtual IP address, the electronic system 1 becomes a member of the VLANs 322 and 323. Also, the network address translation (NAT) rules of the VLANs 322 and 323 are stored in the VPN router 2 in advance. In this way, the electronic system 1 can apply the local security policy of the IPSec protocol to the connection and to the use of related resources of the VLANs 322 and 323.

Regarding the connection of the electronic system 1 to the VPN router 2, the conventional VPN client can only connect to the VPN router 2 through the split tunnel or the full tunnel. When the VPN router 2 can accept only one of the split tunnel and the full tunnel, failed connection is usually occurred. In the present invention, the flexibility is increased by connecting the VPN client to the VPN router 2 through the split tunnel or the full tunnel.

Figure 3:
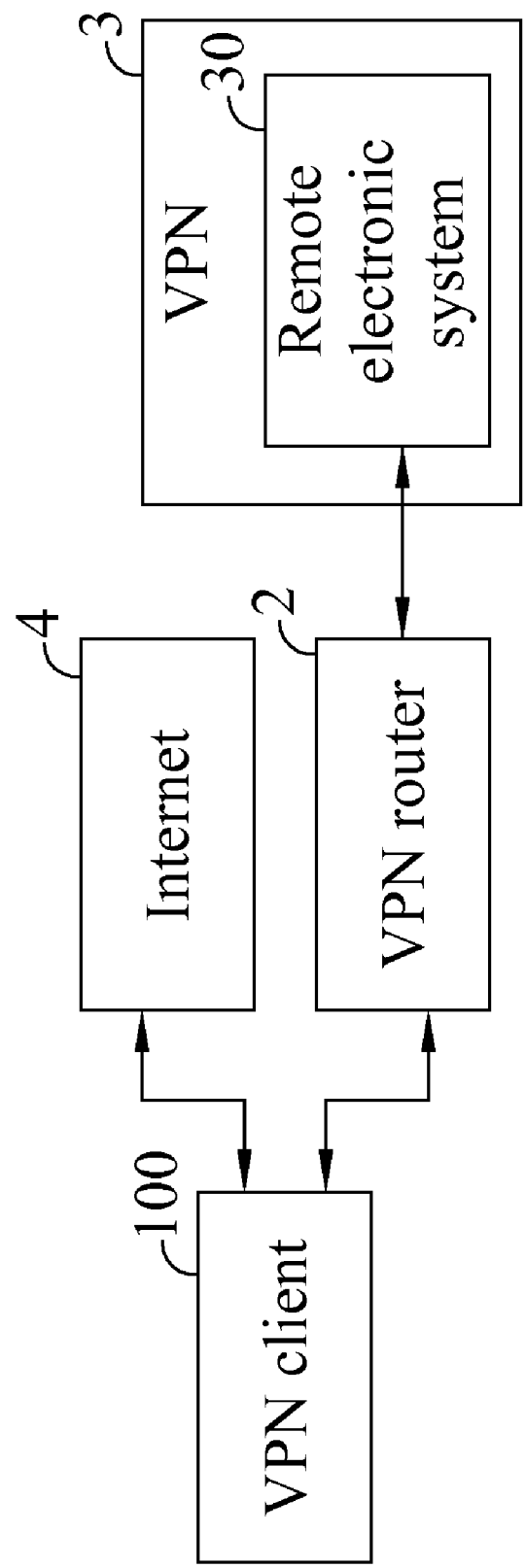
FIG. 3 is a block diagram of a split tunnel for the data transfer system enabling access to multiple subnets according to the present invention.

Please refer to FIG. 3 that is a block diagram of a split tunnel for the data transfer system enabling access to multiple subnets according to the present invention. As shown, after the VPN client 100 is connected to the VPN 3, the connection of the VPN client 100 to the remote electronic system 30 in the VPN 3 must be made via the VPN router 2 while the VPN client 100 can be directly connected to the Internet 4 without using the VPN router 2.

With the aforementioned arrangements, it is able to reduce the load of the VPN router 2 and no additional bandwidth is needed.

Figure 4:
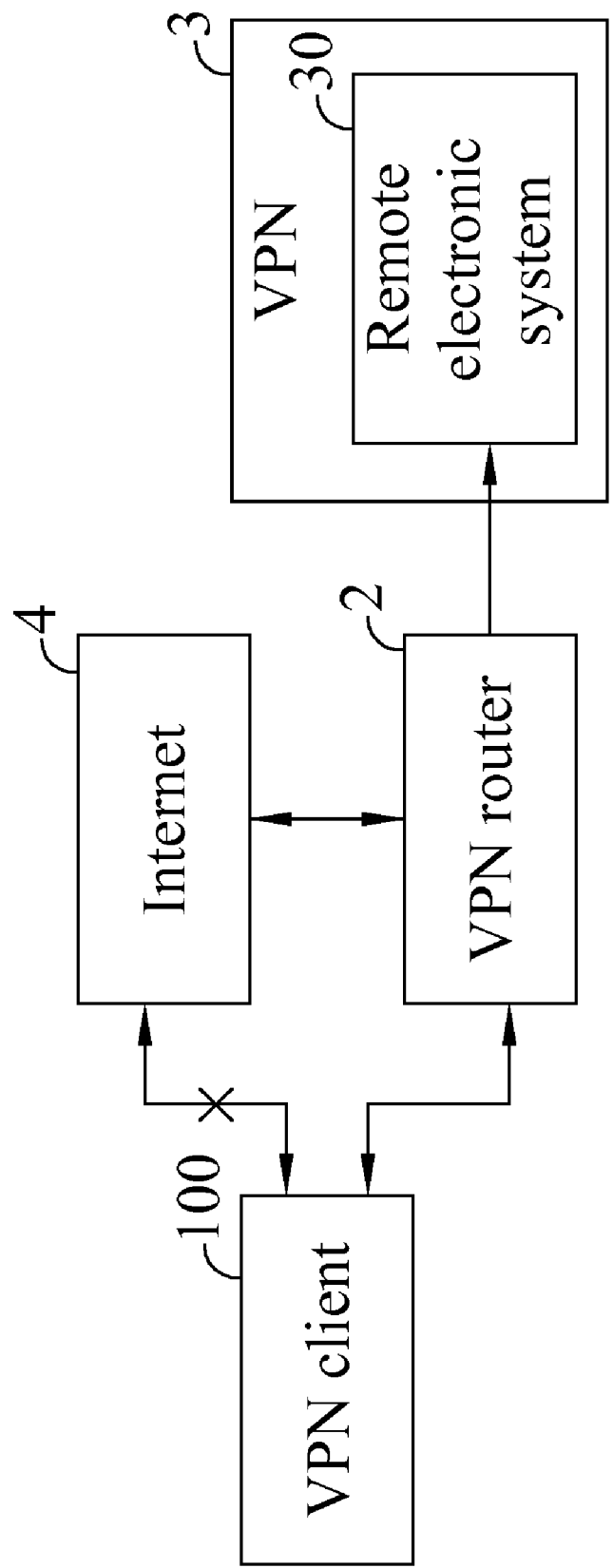
FIG. 4 is a block diagram of a full tunnel for the data transfer system enabling access to multiple subnets according to the present invention.

Please refer to FIG. 4 that is a block diagram of a full tunnel for the data transfer system enabling access to multiple subnets according to the present invention. As shown, after the VPN client 100 is connected to the VPN 3, not only the connection between the VPN client 100 and the remote electronic system 30 in the VPN 3, but also the connection between the VPN client 100 and the Internet 4 must be made via the VPN router 2. That is, the VPN client 100 is connected through the VPN router 2 and not directly connected to the Internet 4. With these arrangements, it is able to enhance the security of the VPN 3 and refuse any risky connection to the Internet 4 that would endanger the security of the VPN 3.

Figure 5:
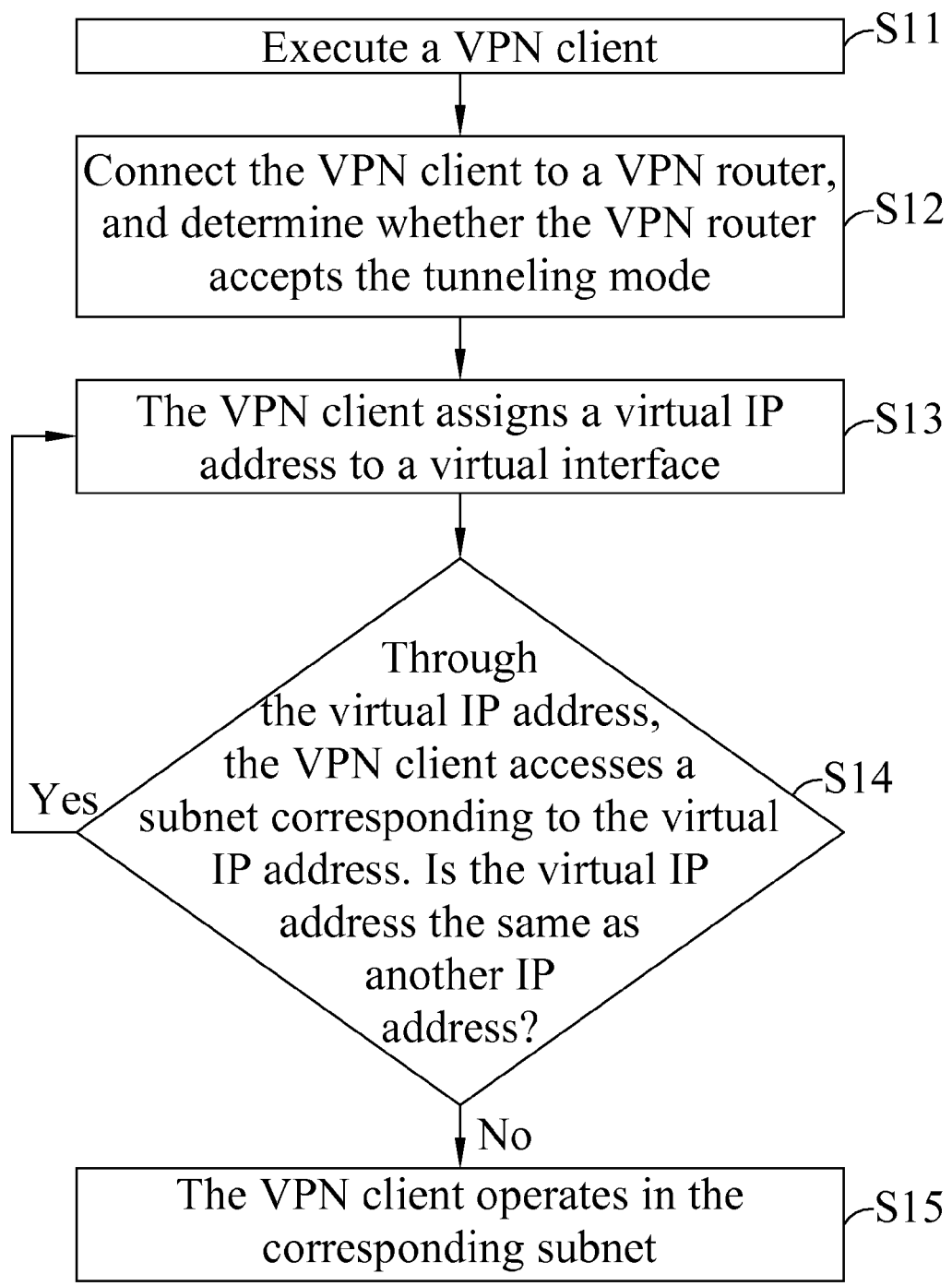
FIG. 5 is a flowchart showing the steps included in a data transfer method enabling access to multiple subnets according to the present invention.

FIG. 5 is a flowchart showing the steps included in a data transfer method enabling access to multiple subnets according to the present invention.

As shown, in step S11, a VPN client installed in an electronic system is executed by a user.

Then, in step S12, the VPN client is connected to a VPN router via a user-selected tunneling mode and using the Hypertext Transfer Protocol over Secure Socket Layer (HTTPS) or the Hypertext Transfer Protocol (HTTP).

Then, in step S13, the VPN client uses an Internet Protocol Security (IPSec) protocol to connect to the VPN router, and a virtual IP address is assigned to a virtual interface simulated by the VPN client.

Then, in step S14, the VPN client accesses a subnet, corresponding to the virtual IP address, in a VPN through the virtual IP address. In the event the virtual IP address is the same as another IP address in the subnet, step S13 is operated to obtain a new IP address. Otherwise, if the virtual IP address is not the same as any other IP address in the subnet, go to step S15.

Finally, in step S15, the VPN client operates on the subnet corresponding to the virtual IP address.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A data transfer system enabling access to multiple subnets, comprising:
   an electronic system comprising:
      a memory unit comprising a virtual private network (VPN) client for simulating a virtual interface and assigning a virtual internet protocol (IP) address to the virtual interface;
      a network unit providing a network transmission module; and
      a processing unit connected to the memory unit and the network unit;
   a VPN router connected to the network unit of the electronic system and providing the electronic system with the ability of logging in a VPN via the VPN router; and
   a plurality of remote electronic systems connected to the VPN router and distributed in at least one subnet of the VPN;
   wherein the electronic system is connected to the VPN router via the network unit, obtains the virtual IP address of the at least one subnet via the VPN router, and assigns the virtual IP address to the virtual interface, and the electronic system is connected to the plurality of remote electronic systems in the at least one subnet of the VPN.

2. The data transfer system enabling access to multiple subnets as claimed in claim 1, wherein the network unit is selected from the group consisting of a network interface card and a network interface chip.

3. The data transfer system enabling access to multiple subnets as claimed in claim 1, wherein the electronic system is connected to the VPN router in a tunneling mode, and the tunneling mode is selected from the group consisting of a split tunnel and a full tunnel.

4. The data transfer system enabling access to multiple subnets as claimed in claim 3, wherein the electronic system is connected to the VPN router via the split tunnel, and only partial connection of the VPN client is directed to the VPN router.

5. The data transfer system enabling access to multiple subnets as claimed in claim 3, wherein the electronic system is connected to the VPN router via the full tunnel, and all connections of the VPN client are directed to the VPN router.

6. The data transfer system enabling access to multiple subnets as claimed in claim 1, wherein the VPN client is connected to the VPN router using a network protocol, and the network protocol is selected from the group consisting of Hypertext Transfer Protocol over Secure Socket Layer (HTTPS) and Hypertext Transfer Protocol (HTTP).

7. The data transfer system enabling access to multiple subnets as claimed in claim 1, wherein a connection is established between the VPN client and the VPN router in accordance with an Internet Protocol Security (IPSec) protocol.

8. The data transfer system enabling access to multiple subnets as claimed in claim 7, wherein the IPSec protocol comprises a packet encryption process.

9. The data transfer system enabling access to multiple subnets as claimed in claim 1, wherein the virtual interface has a virtual network interface card function simulated by the VPN client, and the virtual IP address is assigned to the virtual interface.

10. The data transfer system enabling access to multiple subnets as claimed in claim 1, wherein the virtual IP address corresponding to the at least one subnet is within an IP address range of the at least one subnet.

11. The data transfer system enabling access to multiple subnets as claimed in claim 1, wherein, when the virtual IP address is repeated, the VPN client and the VPN router are arranged to re-establish the connection therebetween.

12. The data transfer system enabling access to multiple subnets as claimed in claim 3, wherein the VPN router selectively establishes a network address translation (NAT) rule according to the tunneling mode.

13. The data transfer system enabling access to multiple subnets as claimed in claim 12, wherein the NAT rule provides a non-physical IP address to physical IP address in compliance with the NAT rule mapping.

14. A data transfer method enabling access to multiple subnets and applying to an electronic system, comprising the following steps of:
   executing a virtual private network (VPN) client installed on the electronic system;
   connecting the VPN client to a VPN router;
   assigning a virtual internet protocol (IP) address to a virtual interface by the VPN client; and
   accessing, through the virtual IP address, at least one subnet corresponding to the virtual IP address by the VPN client.

15. The data transfer method enabling access to multiple subnets as claimed in claim 14, wherein the at least one subnet is in a VPN, and the at least one subnet has an IP address range different from that of other subnets.

16. The data transfer method enabling access to multiple subnets as claimed in claim 14, wherein the VPN router selects the virtual IP address from an unused virtual IP address of a virtual IP address range.

17. The data transfer method enabling access to multiple subnets as claimed in claim 16, wherein the virtual IP address range corresponds to an IP address range of the at least one subnet.

18. The data transfer method enabling access to multiple subnets as claimed in claim 14, wherein the VPN router is configured in a tunneling mode, and the tunneling mode is selected from the group consisting of a split tunnel and a full tunnel.

19. The data transfer method enabling access to multiple subnets as claimed in claim 18, wherein the VPN client is connected to the VPN router via the split tunnel, and only partial connection of the VPN client is directed to the VPN router.

20. The data transfer method enabling access to multiple subnets as claimed in claim 18, wherein the VPN client is connected to the VPN router via the full tunnel, and all connections of the VPN client are directed to the VPN router.

\* \* \* \* \*